US006990486B2

(12) United States Patent (10) Patent No.: US 6,990,486 B2
Ma et al. (45) Date of Patent: Jan. 24, 2006

(54) SYSTEMS AND METHODS FOR DISCOVERING FULLY DEPENDENT PATTERNS

(75) Inventors: Sheng Ma, Briarcliff Manor, NY (US); Joseph L. Hellerstein, Ossining, NY (US); Feng Liang, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 09/929,883

(22) Filed: Aug. 15, 2001

(65) Prior Publication Data

US 2003/0078686 A1 Apr. 24, 2003

(51) Int. Cl.
*G06F 7/00* (2006.01)
(52) U.S. Cl. .................. 707/6; 707/100; 707/104.1; 707/200
(58) Field of Classification Search .............. 707/1–10, 707/100–102, 104.1, 200, 201; 706/46–48, 706/1

See application file for complete search history.

(56) References Cited

U.S. PATENT DOCUMENTS

| | | | | |
|---|---|---|---|---|
| 5,809,499 | A * | 9/1998 | Wong et al. | 707/6 |
| 5,819,266 | A * | 10/1998 | Agrawal et al. | 707/6 |
| 6,263,327 | B1 * | 7/2001 | Aggarwal et al. | 706/47 |
| 6,434,570 | B1 * | 8/2002 | Rangan | 707/104.1 |
| 6,553,359 | B1 * | 4/2003 | Schwenkreis | 706/46 |
| 6,629,090 | B2 * | 9/2003 | Tsuda et al. | 706/47 |
| 6,697,802 | B2 * | 2/2004 | Ma et al. | 707/6 |
| 2002/0103793 | A1 * | 8/2002 | Koller et al. | |

OTHER PUBLICATIONS

U.S. Appl. No. 09/739,432, filed Dec. 18, 2000, J.L. Hellerstein et al., "Systems and Methods for Discovering Partially Periodic Event Patterns".

U.S. Appl. No. 09/918,253, filed Jul. 30, 2001, S. Ma et al., "Systems and Methods for Discovering Mutual Dependence Patterns".

R. Agrawal et al., "Mining Association Rules Between Sets of Items in Large Databases," Proc. of VLDB, pp. 207-216, 1993.

B. Liu et al., "Mining Association Rules with Multiple Minimum Supports," Proceedings of the ACM SIGKDD International Conference on Knowledge Discovery and Data Mining, 1999.

S. Brin et al., "Beyond Market Baskets: Generalizing Association Rules to Correlations," Data Mining and Knowledge Discovery, pp. 39-68, 1998.

E. Cohen et al., "Finding Interesting Associations without Support Pruning," ICDE, pp. 489-499, 2000.

(Continued)

*Primary Examiner*—Greta Robinson
*Assistant Examiner*—Miranda Le
(74) *Attorney, Agent, or Firm*—Rafael Perez-Pineiro; Ryan, Mason & Lewis, LLP

(57) ABSTRACT

A new form of pattern referred to as a fully dependent pattern or d-pattern is provided. The d-pattern captures dependence among a set of items based on a dependency test. An efficient algorithm is provided for discovering all d-patterns in data. Specifically, a linear algorithm is provided for testing whether a pattern is an d-pattern. Further, a pruning algorithm is provided that prunes the search space effectively. Still further, a level-wise algorithm for mining d-patterns is provided.

32 Claims, 8 Drawing Sheets

OTHER PUBLICATIONS

J. Yang et al., "Informiner: Mining Surprising Periodic Patterns," Int'l Conf. on Knowledge Discovery and Data Mining, 2001.

R. Srikant et al., "Mining sequential patterns: Generalizations and performance improvements," Proc. of the Fifth Int'l Conference on Extending Database Technology (EDBT), Avignon, France, 1996.

H. Mannila et al., "Discovery of frequent episodes in event sequences," Data Mining and Knowledge Discovery, 1(3), 1997.

* cited by examiner

FIG. 1
(A)
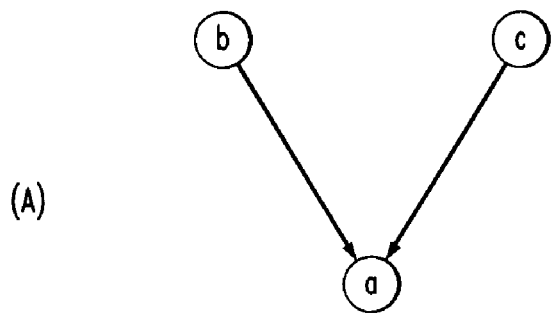
(B)
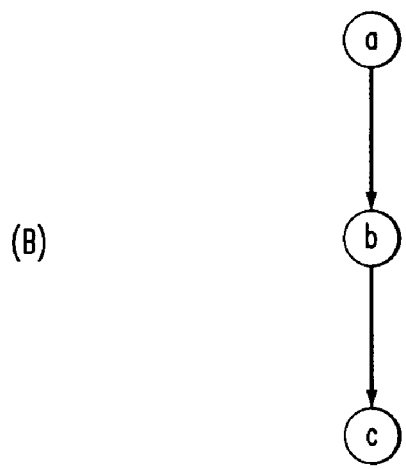
(C)
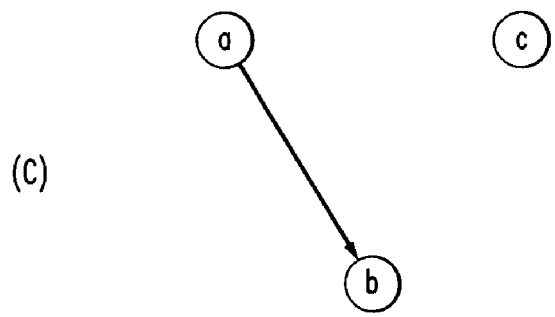

| PATTERNS | COUNT |
|---|---|
| a | 3 |
| b | 2 |
| c | 1 |
| d | 4 |
| e | 3 |
| f | 4 |
| g | 5 |
| h | 2 |
| i | 1 |
| j | 2 |

| PATTERNS | COUNT |
|---|---|
| a b | 2 |
| a d | 3 |
| a e | 1 |
| a f | 1 |
| a g | 3 |
| ... | ... |

EXAMPLE FOR DEPENDENCY

{ag}: FREQUENT, IS NOT d-PATTERN WITH 95% CONFIDENCE
p(a) = 3/10; p(g) = 5/10; p* = 3/10 * 5/10 = 0.15
minsup({a,g}) = 10 * 0.15 + 1.86 * sqrt (10 * 0.15 * (1−0.15))
= 3.6

{ab}: IS NOT FREQUENT, BUT IS d-PATTERN WITH 95% CONFIDENCE
p(a) = 3/10, p(b) = 2/10, p* = 2/10 * 3/10 = 0.06
minsup({a,b}) = 10 * 0.06 + 1.86 * sqrt (10 * 0.06 * (1−0.06))
= 1.99

SYSTEMS AND METHODS FOR DISCOVERING FULLY DEPENDENT PATTERNS

FIELD OF THE INVENTION

The present invention relates generally to data processing techniques and, more particularly, to methods and apparatus for discovering infrequent, but fully dependent patterns in data.

BACKGROUND OF THE INVENTION

As it becomes feasible to collect large volumes of data, businesses are increasingly looking for ways to capitalize on this data, especially market data. Thus, such businesses turn toward data mining techniques. As is known, data mining seeks to discover interesting and previously unknown patterns or information from a large amount of historical data often stored in a database, e.g., market data. Specifically, one key aspect of data mining is to search for significant patterns embedded in the data. Here, a pattern refers to a set of items denoted as pat=$\{i_1, i_2, i_3, \ldots i_k\}$, where $i_k$ is the k-th item.

Existing approaches have focused on discovering one special form of pattern called a frequent association pattern, referred to as "fa-pattern." Fa-patterns are patterns whose support (or occurrences) in data is above a predefined minimum support threshold called minsup. Several applications of the fa-pattern have been studied. The most popular one is the "market basket" analysis, in which an algorithm is applied to mine transaction data consisting of a set of transactions. A transaction is a set of items purchased by a customer. For example, a customer may buy milk, bread, and beer, together. The corresponding transaction is thus trans=$\{a, b, c\}$, where a, b, and c may represent milk, bread, and beer, respectively. The association discovery problem can be formally stated as: find all patterns (i.e., a set of items) whose number of co-occurrences in D is above a predefined threshold called minimum support (minsup), where D is a set of N transactions $\{trans_1, \ldots, trans_N\}$. We note that an item here is a generic name. It is mapped to an original data object by a certain mapping scheme. For example, an original data object of transaction data may have multiple attributes such as the type of goods (e.g., milk, beer), its brand, quantity, and purchase time. One commonly-used mapping is to map the values of the type into items. For example, milk is represented by "a."

Fa-patterns can be generalized to handle temporal events. Here, the temporal event data is an ordered sequence with length N: $\{(i_1, t_1), (i_2, t_2), \ldots, (i_N, t_N)\}$, where $t_i \leq t_j$ if $i \leq j$. The temporal association discovery problem can be stated as: find all patterns whose number of co-occurrences within a time window w is above minsup. Here, the time window is introduced to essentially segment an ordered time sequence into transactions.

Finding all fa-patterns is not a trivial task because the pattern space is exponentially large, to be precise, $n^k$, where n is the number of distinct items, and k is the maximum length of a pattern. Brute-force iteration is computationally intractable. Recently, Agrawal et al. (as described in R. Agrawal et al., "Mining Association Rules Between Sets of Items in Large Databases," Proc. of VLDB, pp. 207–216, 1993, the disclosure of which is incorporated by reference herein) developed an algorithm called "Apriori" to discover all fa-patterns. This algorithm searches the pattern space in a level-wise manner by the following four step process:

1. Initialization. The data is scanned to find all fa-pattern with only one item. k is set to be 2.
2. Construct candidate patterns with length k. This is typically done by a joint operation of fa-patterns found in the previous level, followed by a pruning operation.
3. Count the candidate patterns. Data is scanned in order to count the occurrences of candidate patterns.
4. Find fa-patterns at the k-th level. Fa-patterns are those candidate patterns whose count (or occurrences) are above minsup.

This procedure proceeds level by level until no more patterns can be found. The key idea of this algorithm is to search the pattern-space in a level-wise manner. The fa-patterns found at the current level are used to eliminate the search space for the next level. In this way, the number of patterns to be searched are minimized, and the number of data scans is the maximum length of fa-patterns. Since the introduction of the "Apriori" algorithm, work has been done to improve the algorithm so as to reduce the number of data scans, reduce the memory requirement, and improve efficiency through different search strategies.

However, in applications such as detecting anomalies in computer networks and identifying security intrusions, there is much more interest in patterns that predict undesirable situations, such as service disruptions. Such patterns are often infrequent (at least in well managed systems) and are characterized by statistical dependency rather than their frequency. Unfortunately, the statistical dependency based on a conventional dependency test yields neither upward nor downward closure, and hence efficient discovery algorithms cannot be constructed.

The present invention is motivated by issues that have been encountered in discovering patterns of events in computer networks. First, as indicated above, the present invention is concerned with how to discover infrequent, but dependent item sets. In computer networks, dependent temporal event sequences provide knowledge to predict later events, which is of particular interest if these events are related to malfunctions and/or service disruptions. Unfortunately, existing mining techniques require the support thresholds to be set very low in order to discover infrequent patterns. This results in a large number of unimportant patterns mixed in with a few patterns of interest.

Second, an application may have to deal with data collected in a noisy environment. In networks, data may be lost because of severed communication lines or router buffer overflows. In help desk systems, data may be corrupted because of human errors. Some valid patterns will be missed due to the presence of noise. To illustrate, suppose there is a 15-item pattern with a true frequency of 15% and the minimal support is set to be 10%. Assume that the data is received through a transmission channel in which each item could be lost with a probability of 5%. Due to the missing information, the observed frequency will be $15\%*(0.95)^{15}$ or approximately 7%, which is less than the minimal support. With a bit more calculation, it can be seen that only subpatterns with lengths no greater than 7 would satisfy a minimal support of 10%. Consequently, instead of reporting one long pattern with length 15, over 6435 subpatterns with length 7 or less are found and reported as the maximal frequent item sets. Clearly, the problem is due to the fixed minimum support threshold that favors short item sets over long ones.

Third, one may be concerned with skewed distributions of items. It has been found, through experience with alarms in computer systems, that 90% of the events are often generated by only 10% or 20% of the hosts. In B. Liu et al., "Mining Association Rules with Multiple Minimum Supports," Proceedings of the ACM SIGKDD International Conference on Knowledge Discovery and Data Mining, 1999, the disclosure of which is incorporated by reference herein, it has been argued that this is a major obstacle to applying traditional association mining in which a minimum support is fixed. This motivates B. Liu et al. to use multiple minimum support thresholds that take into account the distribution of items and the length of an item set. However, this introduces extra parameters, which complicates pattern discovery.

SUMMARY OF THE INVENTION

The present invention provides techniques for mining or discovering patterns that can not be found effectively and efficiently using existing pattern mining techniques and which may be valuable for a variety of applications. Specifically, the invention defines a fully dependent pattern or "d-pattern." A d-pattern captures dependence among a set of items based on a dependency test. Thus, infrequent, but dependent, patterns may be found.

In one aspect of the invention, a technique for mining one or more patterns in an input data set of items comprises identifying one or more sets of items in the input data set as one or more patterns based on whether the one or more sets respectively satisfy a dependency test, the dependency test being satisfied when each of the items in a set of items is dependent upon each other item with a prescribed significance level. The one or more identified patterns are output based on results of the dependency tests. The input data set may comprise such data as event data and/or transaction data. The dependency test preferably employs a normal approximation test when an occurrence count of the items of a set is above a threshold value, and a Poisson approximation test otherwise.

In accordance with the invention, these d-pattern discovery techniques may yield the following advantageous properties. First, such d-pattern testing is downward closed. Second, a minimum support threshold value associated with the dependency test increases as the frequency of items in a set increases, when a probability that the set is in the input data set is less than a predetermined percentage, e.g., approximately fifty percent. Third, the minimum support threshold value decreases as the size of an item set increases.

In another aspect of the invention, a technique for mining one or more patterns in an input data set of items comprises: obtaining an input data set of items; searching the input data set of items to identify one or more sets of items in the input data set as one or more patterns based on whether the one or more sets respectively satisfy a dependency test, the dependency test being satisfied when each of the items in a set of items is dependent upon each other item with a prescribed significance level; and outputting the one or more identified patterns based on results of the dependency tests.

Prior to the searching operation, the input data set may be normalized so that the data is not application-dependent. The outputting operation may convert the one or more identified patterns into a human readable format. The searching operation may comprise performing a level-wise scan based on a set length to determine candidate sets of items in the input data set that satisfy the dependency test. The search step may also comprise pruning candidate sets.

Discovering such d-patterns may benefit many applications. For example, such a d-pattern in an event management application indicates that a set of events are fully dependent above a minimum support threshold. This implies strong correlation among events. Thus, event correlation rules can be developed for the purpose of either event compression or on-line monitoring. Of course, in accordance with the principles of the invention taught herein, one of ordinary skill in the art will realize many other applications of d-patterns.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 1A through 1C are diagrams respectively illustrating three Bayesian network structures;

FIG. 2A is a diagram illustrating an example of the concept of d-patterns according to the invention in accordance with transaction data;

DETAILED DESCRIPTION OF PREFERRED EMBODIMENTS

Figure 2B:
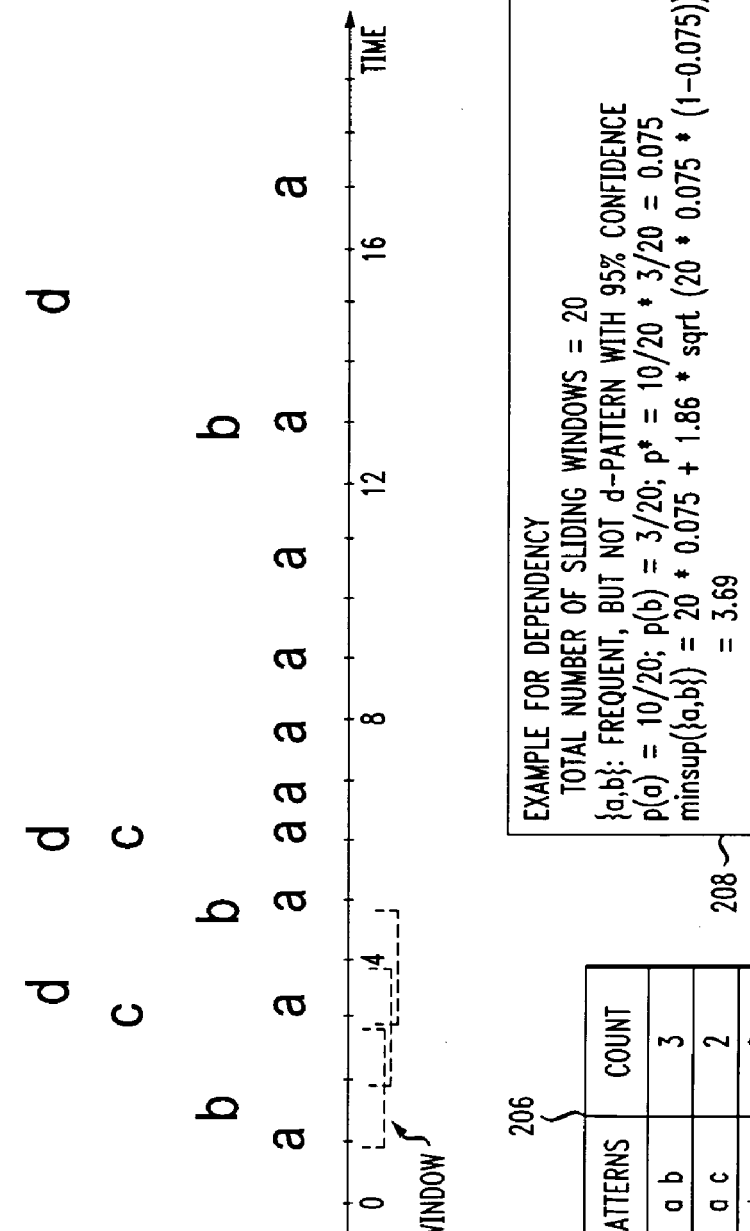
FIG. 2B is a diagram illustrating an example of the concept of d-patterns according to the invention in accordance with event sequence data.

The present invention provides techniques for mining fully dependent patterns that can not be found effectively and efficiently using conventional pattern discovery frameworks. In particular, the present invention provides for a new pattern that addresses the three aforementioned issues (in background section above) associated with conventional pattern discovery frameworks. We note that the above three issues are directly related to the first step of association rule discovery, i.e., finding all frequent patterns with a fixed threshold. To address these issues, the present invention employs a hypothesis test. Hypothesis testing has been used to test whether a set of variables significantly exceeds an assumed baseline distribution. When there is no specific prior knowledge about the association in a data set, the reasonable baseline distribution is the independent distribution. Any departure from the independent distribution will be of interest. Such a hypothesis test is known as a dependency test.

However, the conventional dependency test is neither downward nor upward closed, a situation that impairs the efficiency of pattern discovery. Although, the dependency test can be applied in the post-processing of all frequent item sets, doing so limits the ability to discover infrequent but dependent item sets.

This problem, at least in part, motivated the development of a fully dependent pattern or "d-pattern" in accordance with the present invention. As will be explained, a d-pattern requires its subsets to satisfy a new dependency test, as will be defined below. Clearly, full dependency is very stringent dependency.

As mentioned, a dependency test, which can essentially be considered a chi-square test, has been used previously. For example, S. Brin et al. (i.e., S. Brin et al., "Beyond Market Baskets: Generalizing Association Rules to Correlations," Data Mining and Knowledge Discovery, pp. 39–68, 1998, the disclosure of which is incorporated by reference herein) used the chi-square test for testing the dependence of a set of variables. Ma et al. (i.e., U.S. patent application Ser. No. 09/739,432, filed on Dec. 18, 2000, and entitled "Systems and Methods for Discovering Partially Periodic Event Patterns," the disclosure of which is incorporated by reference herein) used the chi-square test for testing periodicity associated with "p-patterns." However, all these works used the normal approximation that assumes that the sample size is large. In the present invention, techniques are provided for mining infrequent, but fully dependent item sets in the presence of noise.

There has been some interest recently in infrequent patterns. Ma et al. (i.e., U.S. patent application identified as Ser. No. 09/918,253, filed on Jul. 30, 2001, and entitled "Systems and Methods for Discovering Mutual Dependence Patterns," the disclosure of which is incorporated by reference herein) proposes "m-patterns," which require items in a pattern to be mutually dependent. In accordance with the present invention, as will be evident, a d-pattern is a much looser condition and can cover more patterns that do not result by chance. Cohen et al. (i.e., E. Cohen et al., "Finding Interesting Associations without Support Pruning," ICDE, pp. 489–499, 2000, the disclosure of which is incorporated by reference herein) defines a symmetric similarity measurement as the ratio of the support of an item set divided by the summation of the supports of its items. However, the focus is on two items that are highly correlated.

The problem of skewed item distributions has been addressed by S. Brin et al. (in the above-referenced S. Brin et al. article), who analyzes this problem and introduces a chi-square test. However, their work focuses on the variable level dependency test, while the present invention focuses on the item level testing. Liu et al. (i.e., the above-referenced B. Liu et al. article) develops an algorithm with multiple support thresholds. Yang et al. (i.e., J. Yang et al., "Informiner: Mining Surprising Periodic Patterns," Int'l Conf. on Knowledge Discovery and Data Mining, 2001, the disclosure of which is incorporated by reference herein) proposes an approach based on information gain. However, none of these prior efforts address infrequent, noisy item sets.

Advantageously, the present invention provides techniques for mining fully dependent patterns that can not be found effectively and efficiently using existing pattern mining techniques. Mining infrequent, but interesting patterns is intrinsically difficult for two reasons. First, there are many combinations of items happening just by chance. Second, it is difficult to distinguish a true pattern from random or noisy patterns. The present invention overcomes these and other difficulties by defining a new pattern called a d-pattern, as will be further defined below. More specifically, the invention provides techniques for discovering d-patterns. To do so, two major issues are addressed: (1) how to distinguish a pattern from those resulting by chance; and (2) how to discover all d-patterns efficiently.

The present invention will be described below in the context of an exemplary application of mining event data in a system management application. However, it is to be understood that the invention is not limited to use with any particular application domain but is rather more generally applicable for use in accordance with any application domain (e.g., systems management, process control, manufacturing, to name a few examples) in which it is desirable to provide a determination of infrequent, but fully dependent patterns in data, generated in accordance with the application domain.

The present invention provides a system for implementing d-pattern discovery algorithms. That is, as will be explained below, the present invention provides a system to mine d-patterns from a large amount of data including both transaction-like data and/or temporal event data. It is to be understood that the d-pattern discovery algorithms of the invention have many applications, e.g., system management application, in which the discovered d-patterns can serve as the basis for forming event correlation rules, problem determination and diagnosis, and abnormality detection. However, the invention is not limited to any particular application.

We organize the remainder of the detailed description as follows. First, we define a fully dependent pattern or a d-pattern. Then, we discuss statistical testing. Lastly, illustrative systems and algorithms for discovering d-patterns are provided.

Our definition for a d-pattern is motivated by two factors. First, intuitively, a d-pattern according to the invention is designed to capture a set of items that occur together for reasons other than random chance. This requires distinguishing between a pattern and a random occurrence. For this, in accordance with the invention, we apply a statistical test. For example, as will be explained below, a dependency test is approximated by either a Normal test or a Poisson test, depending on certain conditions. Second, we need to discover all d-patterns in an efficient manner. This requires d-patterns to have a downward closure property. As a result of such factors, we define the d-pattern as follows:

A set of items $E=\{i_1, i_2, \ldots, i_k\}$ is said to be a d-pattern with a significance level a, if the following two conditions are true:

(1) E passes the dependency test with significance level a.

(2) Any subset of E with more than one item passes the dependency test with significance level a.

The first condition in the definition tests whether the item set is dependent or not. This differentiates a qualified pattern from a random one. The second condition provides two benefits. First, it enables us to develop an efficient algorithm for discovering all d-patterns. Second, it avoids some false patterns. For example, FIGS. 1A through 1C show three different Bayesian network structures for items a, b and c, respectively. No matter which model our data is generated from, the longest pattern passing the dependency test will be {abc}. As will be further explained, the d-patterns are different for the three different structures: {ab, ac} for the model in FIG. 1A; {abc} for the model in FIG. 1B; and {ab} for the model in FIG. 1C.

Now, we discuss the new dependency test used by the d-pattern definition.

Let E be an item set $E=\{i_1 i_2 \ldots, i_m\}$, where $i_1, \ldots, i_m$ represent m items. It is to be understood that an item is a generic name. An item can be mapped to one or more attribute values of data. Let c(E) be the count of the occurrences of E in the data. To distinguish dependent item sets from those occurring by chance, we apply hypothesis testing. To do so, we note that the distribution of c(E) is binomial with parameter n and $P_{\{E\}}$, where $p_{\{E\}}$ is the probability of E being in the data. If the m items in E occur independently, $$p_E = P(\{i_1, i_2, \ldots, i_m\} \subset T) = \prod_{j=1}^{m} p(i_j \subset T) = \prod_{j=1}^{m} p_j.$$

Intuitively, if the m items are associated, the probability of their occurring should be higher than that under the independent assumption, i.e., $p_{\{E\}} > p^*$, where $p^*$ denotes $$\prod_{j=1}^{m} p_j.$$

In the latter computation, all the $p_j$'s whose real values are not available, will be replaced by their estimators $\hat{p}_j = c(i_j)/n$.

These can be further formalized as the following two hypothesis:

$H_0$ (null hypothesis): $p_E = p^*$ $H_a$ (alternative hypothesis): $p_E > p^*$, Clearly, we should reject the null hypothesis (independence assumption), if c(E) is larger than some threshold. Such a threshold can be determined by the pre-specified significance level a (0<a<0.5), where a is known as the upper bound for the probability of false positive (incorrectly accepting $H_a$). The dependency test can then be stated as follows. Given a significance level a, item set E is tested to be dependent, if:

$$c(E) \geq c_a = \max\left\{c : \sum_{i=c}^{n} \binom{n}{i}(p^*)^i(1-p^*)^{n-i} < a\right\}.$$

We will denote $c_a$ by minsup(E), since it is the minimal (or minimum) support for item set E to pass the dependency test with significance level a.

We note that when the sample size n is large, the above exact calculation for minsup(E) could be very time-consuming. In this case, the normal approximation can be applied. Under the null hypothesis, the normalized c(E), $$Z = \frac{c(E) - np^*}{\sqrt{np^*(1-p^*)}}$$

approaches the standard normal distribution by the Central Limiting Theorem. Thus:

$$minsup(E) = np^* + Z_a \sqrt{np^*(1-p^*)}$$

where $z_a$ is the corresponding 1-a normal quintile which can be easily found in a normal table or calculated. For example, $Z_a = 1.64$ for a=5%. Intuitively, a represents a significance level of the test, and 1-a may be referred to as a confidence level (e.g., if significance level is 5%, then confidence level is 95%). A commonly used value for a may be between 1% to 10%. There are many known modifications that may be used to improve the accuracy of the normal approximation. In our illustrative application, it is safe to assume that the number of transactions n is large. However, we still need to distinguish two cases: np* is large and np* is small, where the np* represents the average number of instances of item sets in the data. When np* is reasonable large, say np*>5, the usual normal approximation is sufficiently accurate. However, when p* is extremely small, the Poisson distribution has a better accuracy. In this case, minsup(E) becomes:

$$minsup(E) = \max\left\{c : 1 - \sum_{i=0}^{c-1} \frac{e^{-np^*}(np^*)^i}{i!} < a\right\}.$$

Thus, as the exact dependency test is very time-consuming, the present invention provides a hybrid approach. That is, we check the count of a pattern E, if the count is small, we apply the Poisson approximation; otherwise, we use the normal approximation. This may be represented as the following algorithm:

```
if count(E) > switching threshold
    compute minsup(E) by normal approximation
else
    compute minsup(E) by Poisson approximation
end if
return minsup
```

The inputs to this algorithm are an item set E, the counts of the subsets of the item set E, a confidence level and a switching threshold (i.e., threshold value that is used to determine which approximation to employ). In our experience, it is preferable to set the switching threshold to be five. Given minsup(E) for an item set E, an algorithm for further performing the dependency test may be as follows:

```
if count(E) > minsup(E)
    return true
else
    return false
end if
```

Thus, if the above dependency test algorithm outputs a "true," item set E passes the dependency test. And if all subsets of E have also passed the dependency test, then E is a d-pattern according to the invention. If the algorithm outputs a "false," E fails the dependency test and is not a d-pattern.

For the d-pattern defined above, the following three properties may easily be proven:

(I) A d-pattern is downward closed.

(II) The minimal support minsup(E) increases as the frequency of items increases when p*<50%. In our illustrative application, this p* is often very small.

(III) The minimal support minsup(E) decreases as the size of E increases. In particular, the decrease is exponentially fast for minsup(E) by the normal approximation.

Property I enables us to develop an efficient level-wise algorithm to be described below. Property II provides a natural solution to deal with unevenly distributed data. Property III encourages the algorithm to discover long patterns. These properties demonstrate that the d-pattern definition can solve the three issues discussed above in the background section.

Now, we provide an algorithm for discovering all d-patterns. We start with some notation. A pattern is a set of items. Small-cap symbols are used to represent items. For example, a pattern consisting of items a, b, and c can be represented by pat={a, b, c}. Further, a temporal pattern is a pattern with time window w.

Referring now to FIG. 2A, a diagram illustrates an example of the concept of d-patterns according to the invention in accordance with transaction data. Ten transactions are listed in the left upper part of the figure, denoted as 102. $T_i$, where i=1, 2, ..., 10, represents the i-th transaction. Symbols a to j represent items. Thus, each transaction is considered an item set. Further, we list in tables 104 and 106, the patterns with one item and two items, respectively. We also provide their occurrence counts. For example, the count of pattern {a} is 3. The count of {a,b} is 2. Frequent association patterns (fa-patterns) are the patterns whose number of occurrences is above a minsup threshold. Say, minsup is three. Then, {a, d} and {a,g} are fa-patterns. The d-patterns are defined by the dependency test, which requires that all two subsets are dependent above a minsup threshold. For a pattern with two items, say pat={a,b}, we need to compute p*=p(a)*p(b)=0.06. Thus, the expected count for the random assumption is 10*0.06 0.6. Then, minsup({a,b})=1.99 for 95% confidence, as calculated in FIG. 2A. Thus, {a,b} is a d-pattern with confidence 95%. Likewise, we can verify that {a,g} is not a d-pattern with 95% confidence.

The d-pattern can be generalized to handle event sequence data. FIG. 2B illustrates this concept. An illustrative event sequence, denoted as 202, is drawn on a time axis. In the event sequence, an item is drawn above its occurrence time. Again, we list in tables 204 and 206, the patterns with one item and two items, respectively. We also provide their occurrence counts. In order to associate temporal items, a sliding time window is introduced. In this example, the time window is 2. An occurrence (or an instance) of a pattern requires that the occurrences of all its items be within time window w. In this way, the number of occurrences of a pattern may be counted. The statistical test can then be computed in the same way as in the first example (FIG. 2A). As illustrated in the computations denoted as 208, it can be the case that a d-pattern is not an fa-pattern (e.g., calculation for pattern {d,c} in FIG. 2B), and an fa-pattern is not a d-pattern (e.g., calculation for pattern {a,b} in FIG. 2B).

Now, we discuss an illustrative system for mining d-patterns in accordance with the principles of the invention described above. We start with a generic mining system.

Figure 3:
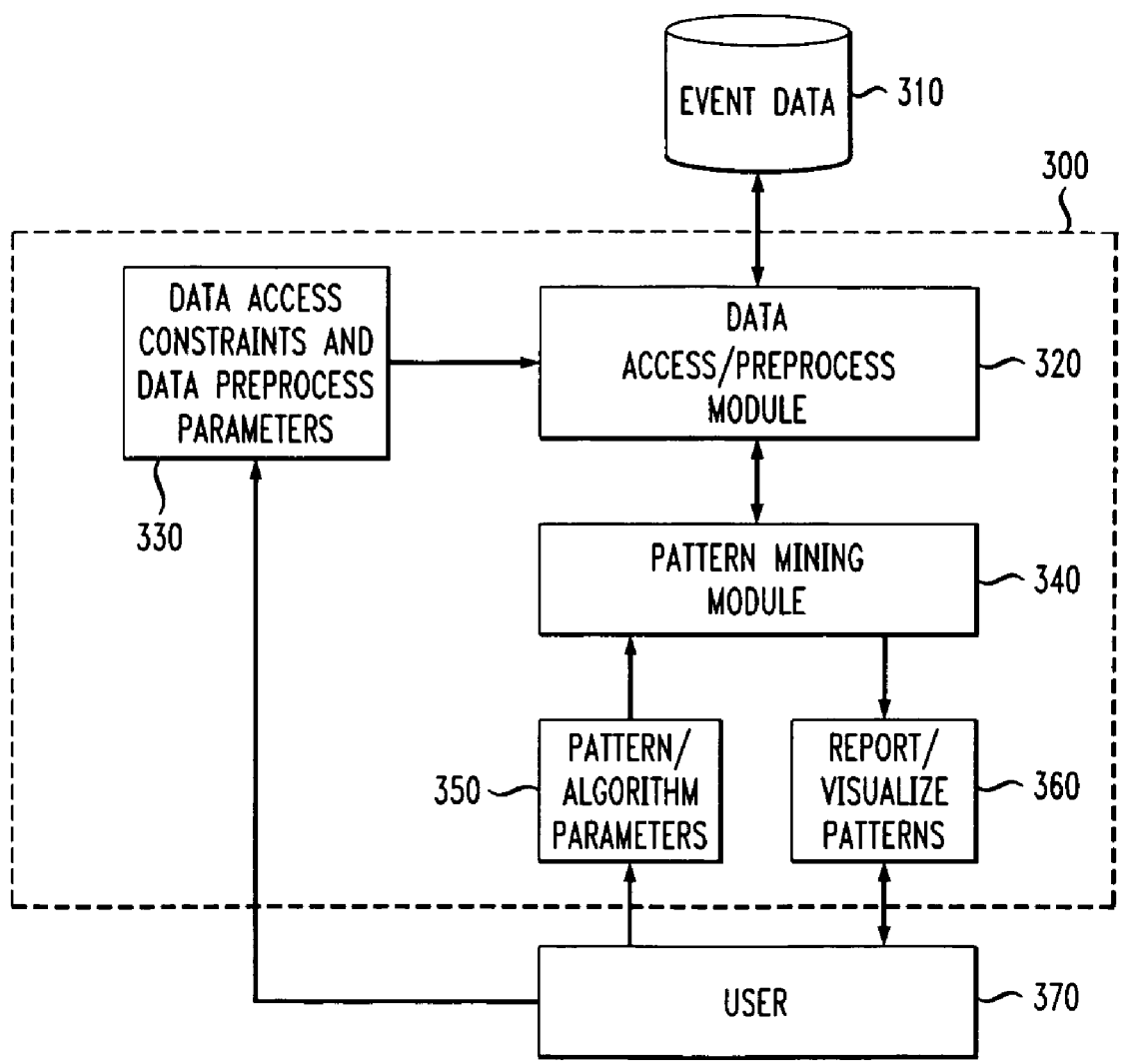
FIG. 3 is a block diagram illustrating a system for mining d-patterns according to an embodiment of the present invention.

Referring now to FIG. 3, a block diagram illustrates a system 300 for mining or discovering fully dependent patterns or d-patterns, as well as other patterns, according to an embodiment of the present invention. As shown, the system includes a data access/preprocess module 320 and a pattern mining module 340, as well as user interface modules 330, 350 and 360. Event data 310 is input to the system and may be stored in either flat files or a database. It is to be understood that the data may alternatively be transaction data. The data access/preprocess module 320 provides basic functions to access and preprocess the event data so as to prepare and load the event data for mining. Data access functions may include SQL-like (Standard Query Language-like) operations based on user-provided constraints input and stored via interface module 330, as well as typical file access functions. Through interface module 330, a user 370 is able to define attributes (e.g., columns) and events (e.g., rows) that are of interest. Such data access constraints and data preprocess parameters are used to perform access/preprocessing functions on the event data in module 320. Preprocessing functions may include data format transformation (e.g., converting raw textual fields into structured fields), attribute mapping functions (e.g., mapping string name into ID), filling in missing data fields, filtering out unwanted recorded data based on constraints (from module 330), etc. It should be noted that it is not necessary to load event data into the main memory of the computer system executing the data access/preprocessing functions. Rather, the data access module 320 preferably provides functions supporting data scan. Such functions may include: (i) get the first (qualified) record; and (ii) get the next record. It may also cache events for a specified time window. These basic data access functions are used by the mining algorithms for scanning the data.

Once proper event data has been defined in accordance with module 320, the pattern mining module 340 processes event data and produces patterns. A d-pattern is one type of pattern that may be of interest to an end-user. Other frequently referred patterns that may be mined by module 340 include, for example, temporal associations (as described in R. Srikant et al., "Mining sequential patterns: Generalizations and performance improvements," Proc. of the Fifth Int'l Conference on Extending Database Technology (EDBT), Avignon, France, 1996, the disclosure of which is incorporated by reference herein) and frequent episodes (as described in H. Mannila et al., "Discovery of frequent episodes in event sequences," Data Mining and Knowledge Discovery, 1(3), 1997, the disclosure of which is incorporated by reference herein). Of course, other patterns may be discovered by the system 300.

It is to be appreciated that the user 370 controls the mining process in three ways. First, the user can control the set of event data that will be mined through defining data access/preprocessing constraints (entered at interface module 330). Second, the user may define the type of patterns (e.g., d-patterns, p-patterns, m-patterns, fa-patterns) to be mined, and determine a mining algorithm to be used and its parameters, including significance scores. Such pattern/algorithm parameters are entered by the user at the interface module 350. Third, the user may determine what kind of patterns are of interest based on specifying interest scores, and interactively view/select patterns that are of interest. Interface module 360 provides an interactive mechanism for a user to examine d-patterns and/or other patterns found. Reporting and visualization of the patterns found can be done in many ways. For example, a view list can be used to list d-patterns found, while a tree view can be used to provide the hierarchical presentation. Visualization techniques can also be used to help a user to understand d-patterns. It is to be appreciated that the present invention is not intended to be limited to any particular reporting and visualization techniques, but rather focuses on pattern mining techniques. Thus, any suitable reporting and visualization techniques may be employed in accordance with module 360.

Figure 4:
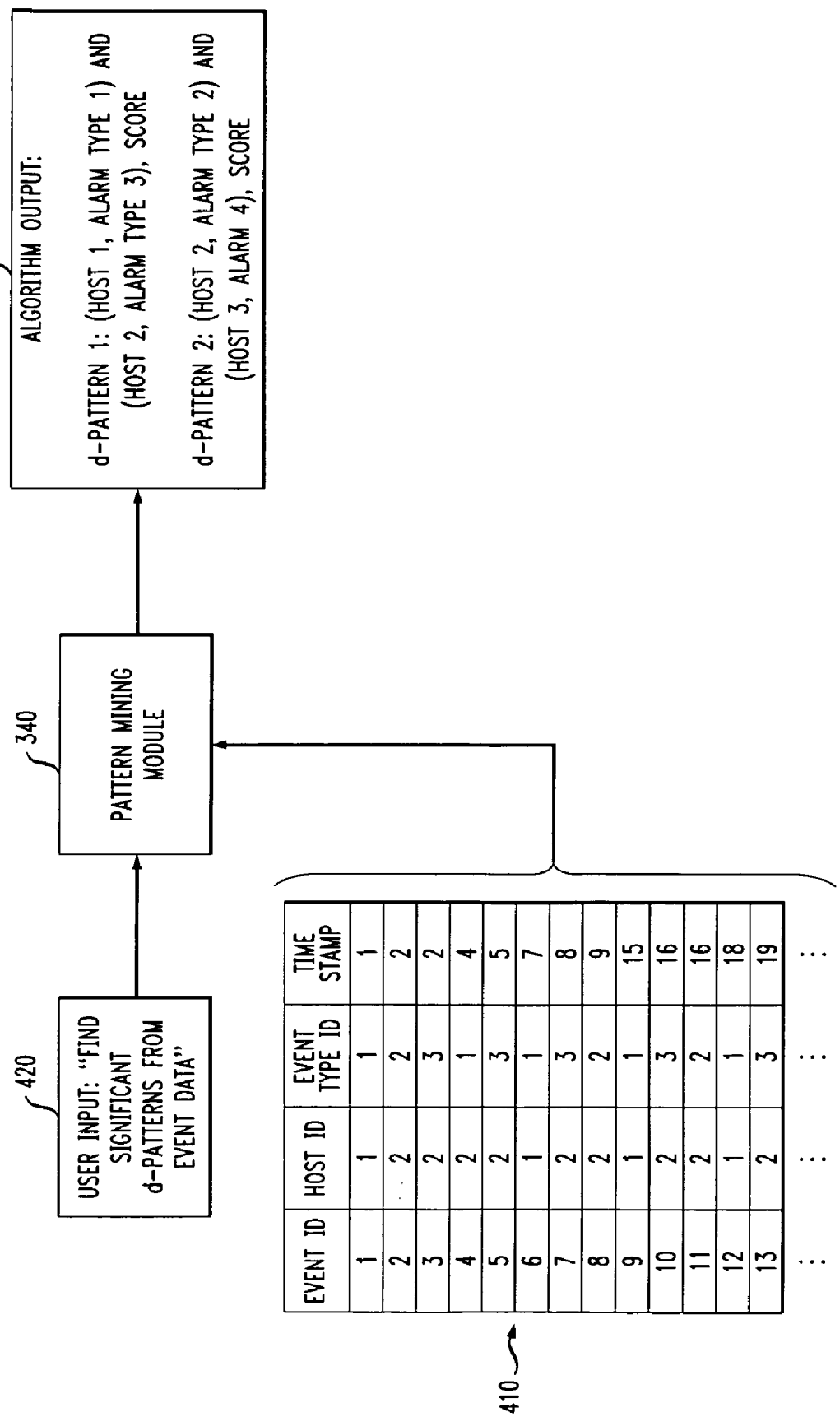
FIG. 4 is a diagram illustrating an example of inputs and outputs associated with the pattern mining module 340 in FIG. 3.

Referring now to FIG. 4, a diagram illustrates an example of inputs and outputs associated with the pattern mining module 340 in FIG. 3. One input is an event table 410. As explained above, the event table may be generated in accordance with the data access/preprocessing module 320. As shown in FIG. 4, each row of the table is an event. Each column of the table is an attribute of an event. This example has four columns. They are: (i) event ID, which is the unique identifier for an event; (ii) host ID, which identifies the originator of an event; (iii) event type ID, which indicates a problem type; and (iv) time stamp, which indicates the occurrence time of an event. We note that the number of columns and their meanings depend on a specific application and, therefore, the invention is not intended to be limited to any specific format. The other input 420 shown in FIG. 4 is the user input command: "Find significant d-patterns from the event data." Not expressly shown, but intended to be implicitly represented in the user command, are the specific user inputs described above in the context of interface modules 330 (data access constraints and data preprocess parameters), 350 (pattern/algorithm parameters), and 360 (report/visualization selection).

The inputs 410 and 420 are processed by the pattern mining module 340 and yield output 430 in the form of one or more discovered d-patterns. Two d-patterns can be found in this example. The first d-pattern is read as "d-pattern 1: (host 1, alarm type 1) and (host 2, alarm type 3)" and the second pattern is read "d-pattern 2: (host 2, alarm type 2)." As shown, a d-pattern is described by the set of events in the d-pattern. For example, d-pattern 1 has two events: (host 1, alarm type 1) read as event from host 1 with alarm type 1, and (host 2, alarm type 3) read as event from host 2 with alarm type 3. The fact that these events are determined to be a d-pattern means that the two events are considered to be fully dependent. D-pattern 2 may be interpreted in the same manner. In addition, the pattern mining module may output other information associated with the d-pattern such as, for example, a score associated with the d-pattern such as the value Z given in the equations above and illustratively calculated in FIGS. 2A and 2B.

Figure 5:
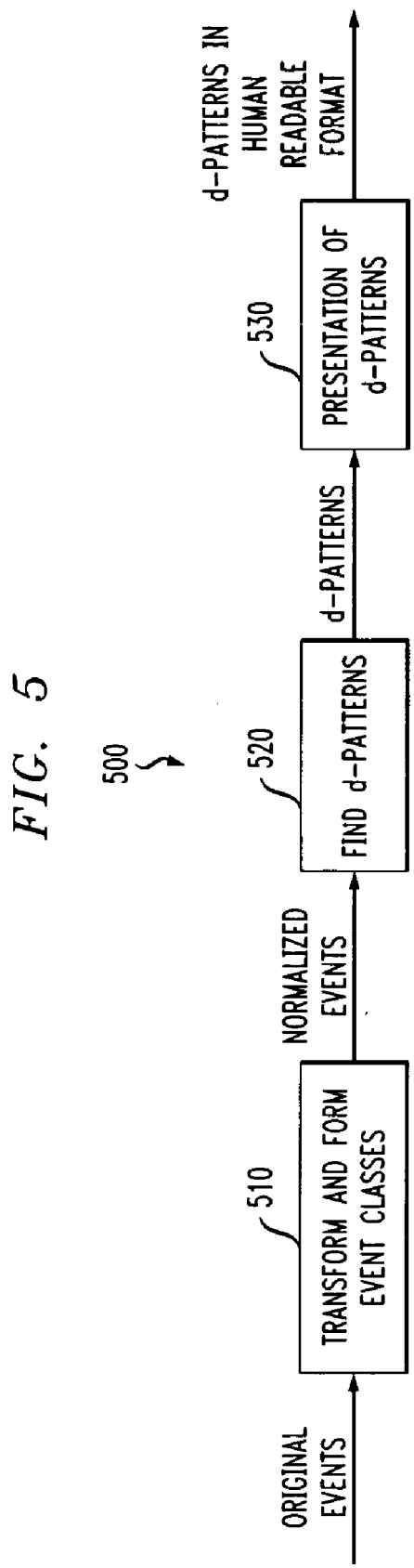
FIG. 5 is a flow diagram illustrating a pattern mining methodology according to an embodiment of the present invention.

FIG. 5 is a flow diagram illustrating a pattern mining methodology according to an embodiment of the present invention. Specifically, FIG. 5 shows a methodology 500 that may be employed by the pattern mining module 340 (FIG. 3). In accordance with this embodiment, discovering d-patterns is accomplished in three steps: (i) transforming an event table (step 510); (ii) finding d-patterns (step 520); and (iii) transforming the d-patterns found to a human readable format or presentation (step 530). The first step (step 510) transforms an application-dependent table into a normalized, application-independent table. This will be further described in the context of FIG. 6. The second step (step 520) of finding d-patterns has been described above and will be further illustrated in the context of FIG. 7. The last step (step 530) is to reformat the discovered patterns into human readable format. This may involve reverse mapping of ID to names. It may also include certain user interfaces for visualizing and summarizing patterns.

Figure 6:
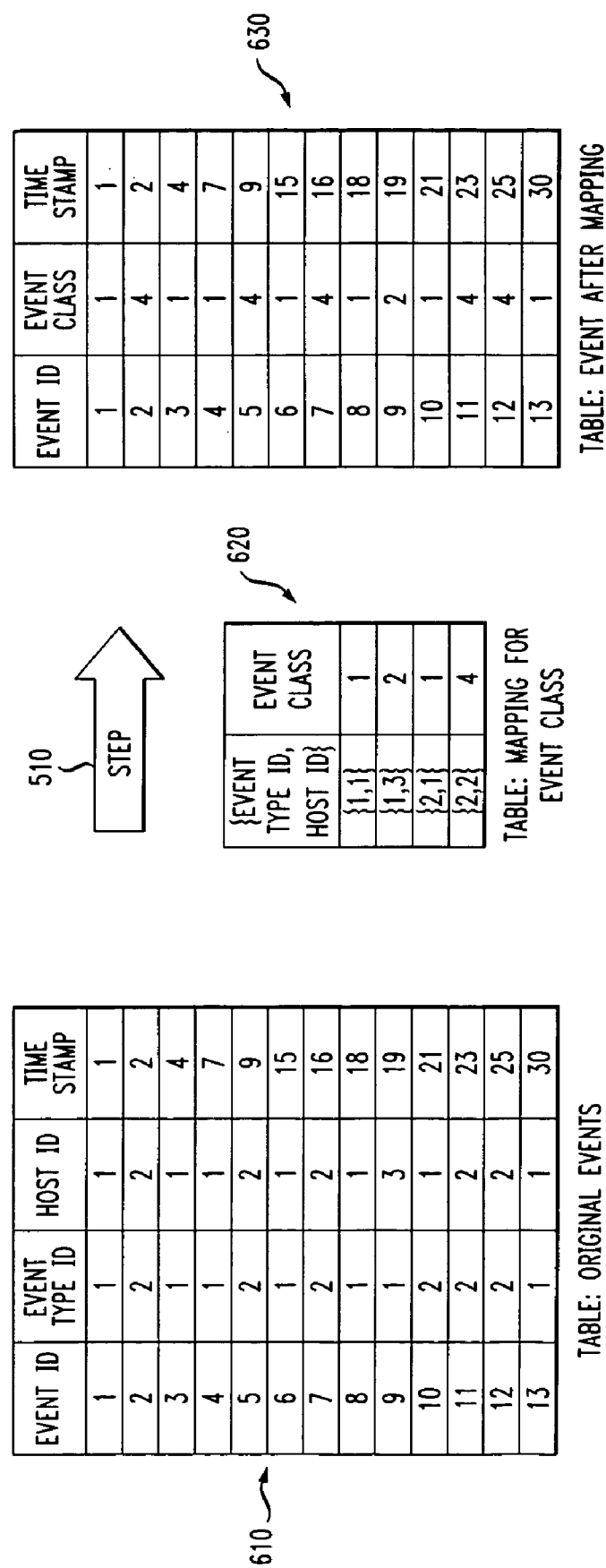
FIG. 6 describes a data transformation operation (step 510 of FIG. 5) of a working example.

FIG. 6 describes the data transformation operation (step 510 of FIG. 5) of our working example. The input of the working example is a table 610 with four attributes: event ID, event type ID, Host ID, and time stamp. The output is a normalized table 630 containing only three columns. Among them, event ID (column 1) and the time stamp (column 3) are directly copied from the input table. The event class ID (column 2) encodes the rest of the attributes of an event. In this example, the event class ID encodes or maps the pair of source name (host ID) and alarm type (event type ID) based on a lookup table 620 built by the algorithm. The lookup table 620 defines mapping rules. For example, the first entry of the lookup table maps events generated by host 1 with alarm type 1 into event class 1. Through this step, an application-independent table is obtained. A lookup-table type algorithm, as is well known in the art, can be used to perform this step.

Now, we describe an algorithm for mining d-patterns according to an embodiment of the present invention.

Figure 7:
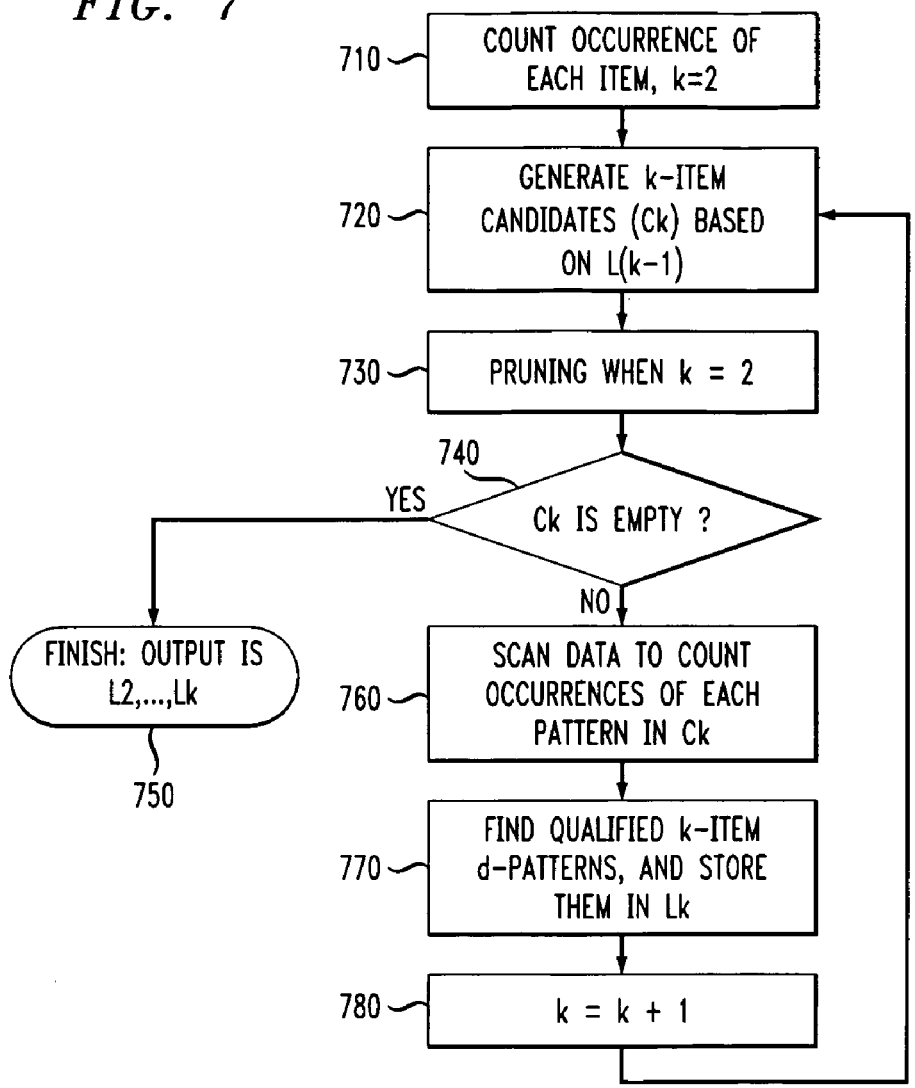
FIG. 7 is a flow diagram illustrating an d-pattern discovery methodology according to an embodiment of the present invention.

FIG. 7 is a flow diagram illustrating a d-pattern discovery methodology according to an embodiment of the present invention. Specifically, FIG. 7 illustrates the process of step 520 in FIG. 5. The inputs to the process are normalized event data D and a confidence level (a default may be 95%). The process outputs a set of d-patterns. In particular, step 710 initializes the process. This includes: setting k=1; each distinct item is an d-pattern with length 1, and L1 contains all d-patterns with length 1. A count is determined for each item. Then, still in step 710, k is set to 2. Ck represents a set of candidate d-patterns with length k. Lk represents all qualified patterns with length k. Step 720 generates a new Ck based on L(k−1). If k=2, then C(k) is pruned, as will be described below. Step 740 tests whether Ck is empty. If yes, the process terminates and outputs L, in step 750. Step 760 scans data and counts the occurrences (instances) of patterns in Ck. Step 770 then tests whether a pattern in Ck is a d-pattern using a methodology, as described above. This step tests for dependence as defined in accordance with the invention. Now, we have a set of qualified d-patterns with length k, which are stored in Lk. Lastly, step 780 increments k and the process is iterated for the next level. The process iterates through each level until all d-patterns are discovered.

An illustrative pruning algorithm that may be employed in step 730 of FIG. 7 is as follows. As mentioned above, this example details the pruning algorithm used at level 2. For each candidate pattern pat={i1, i2}, minsup(pat) is computed in a manner as described above. Then, a check is performed to determine whether count(i1) and count(i2) are above minsup(pat). If not, the pattern should be removed from the candidate pattern set because it is known that pattern can not be a d-pattern. If the counts are above minsup(pat) then that pattern is not pruned.

Figure 8:
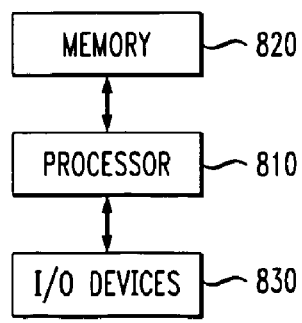
FIG. 8 is a block diagram illustrating a generalized hardware architecture of a computer system suitable for implementing a system for discovering d-patterns according to the present invention.

Referring now to FIG. 8, a block diagram is shown illustrating a generalized hardware architecture of a computer system suitable for implementing the various functional components/modules of a system for discovering d-patterns as depicted in the figures and explained in detail herein. It is to be understood that the individual components of the pattern mining system, e.g., as illustrated in FIG. 3, may be implemented on one such computer system, or on more than one separate such computer system. Also, individual components of the system may be implemented on separate such computer systems. It is to be appreciated that the user (e.g., 370 in FIG. 3) may interact directly with the one or more computer systems implementing the pattern mining system 300. Alternatively, the user may employ a computer system in communication (e.g., via a remote or local network) with the one or more computer systems implementing the system 300 in order to interact with the system 300.

As shown, the computer system may be implemented in accordance with a processor 810, a memory 820 and I/O devices 830. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data (e.g., user commands, constraints, parameters, etc.) to the processing unit, and/or one or more output devices (e.g., CRT display, printer, etc.) for presenting results (e.g., view lists, pattern visualizations, etc.) associated with the processing unit. For example, system user interfaces employed by the user may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Advantageously, as described above, a new form of pattern is provided in accordance with the invention, referred to as a fully dependent pattern or d-pattern. The d-pattern captures dependence among a set of items based on a dependency test. An efficient algorithm is provided for discovering all d-patterns in data. Specifically, a linear algorithm is provided for testing whether a pattern is an d-pattern. Further, a pruning algorithm is provided that prunes the search space effectively. Still further, a level-wise algorithm for mining d-patterns is provided.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of mining one or more patterns in an input data set of items, the method comprising the steps of:
   identifying one or more sets of items in the input data set as one or more patterns based on whether the one or more sets respectively satisfy a dependency test, the dependency test being satisfied when each of the items in a set of items is dependent upon each other item with a prescribed significance level; and
   outputting the one or more identified patterns based on results of the dependency tests;
   wherein the dependency test employs a normal approximation test when an occurrence count of the items of a set is above a threshold value, and a Poisson approximation test otherwise.

2. The method of claim 1, wherein a minimum support threshold value associated with the dependency test increases as the frequency of items in a set increases, when a probability that the set is in the input data set is less than a predetermined percentage.

3. The method of claim 2, wherein the predetermined percentage is approximately fifty percent.

4. The method of claim 1, wherein a minimum support threshold value associated with the dependency test decreases as the size of an item set increases.

5. The method of claim 1, wherein the input data set comprises transaction data.

6. The method of claim 1, wherein the input data set comprises event data.

7. A computer-based method of mining one or more patterns in an input data set of items, the method comprising the steps of:
   obtaining an input data set of items;
   searching the input data set of items to identify one or more sets of items in the input data set as one or more patterns based on whether the one or more sets respectively satisfy a dependency test, the dependency test being satisfied when each of the items in a set of items is dependent upon each other item with a prescribed significance level; and
   outputting the one or more identified patterns based on results of the dependency tests;
   wherein the dependency test employs a normal approximation test when an occurrence count of the items of a set is above a threshold value, and a Poisson approximation test otherwise.

8. The method of claim 7, further comprising, prior to the searching step, the step of normalizing the input data set.

9. The method of claim 8, wherein the input data set comprises event data and the normalizing step comprises transforming at least a portion of the event data into event classes such that the event data is non-application-dependent.

10. The method of claim 9, wherein the event data transformation step further comprises the step of mapping two or more attributes associated with an event into an event class.

11. The method of claim 10, wherein the mapping step is performed in accordance with a lookup table.

12. The method of claim 11, wherein the event data is in a tabular form with a first number of columns before the transformation step and in a tabular form with a second number of columns after the transformation step, the second number of columns being less than the first number of columns.

13. The method of claim 7, wherein the outputting step further comprises converting the one or more identified patterns into a human readable format.

14. The method of claim 7, wherein the searching step further comprises the step of performing a level-wise scan based on a set length to determine candidate sets of items in the input data set that satisfy the dependency test.

15. The method of claim 14, further comprising the step of pruning candidate sets.

16. Apparatus for mining one or more patterns in an input data set of items, the apparatus comprising:
   at least one processor operative to: (i) identify one or more sets of items in the input data set as one or more patterns based on whether the one or more sets respectively satisfy a dependency test, the dependency test being satisfied when each of the items in a set of items is dependent upon each other item with a prescribed significance level, wherein the dependency test employs a normal approximation test when an occurrence count of the items of a set is above a threshold value, and a Poisson approximation test otherwise; and (ii) output the one or more identified patterns based on results of the dependency tests; and
   a memory, coupled to the at least one processor, which stores at least one of the input data set and the one or more identified patterns.

17. The apparatus of claim 16, wherein a minimum support threshold value associated with the dependency test increases as the frequency of items in a set increases, when a probability that the set is in the input data set is less than a predetermined percentage.

18. The apparatus of claim 17, wherein the predetermined percentage is approximately fifty percent.

19. The apparatus of claim 16, wherein a minimum support threshold value associated with the dependency test decreases as the size of an item set increases.

20. The apparatus of claim 16, wherein the input data set comprises transaction data.

21. The apparatus of claim 16, wherein the input data set comprises event data.

22. Apparatus for mining one or more patterns in an input data set of items, the apparatus comprising:

at least one processor operative to: (i) obtain an input data set of items; (ii) search the input data set of items to identify one or more sets of items in the input data set as one or more patterns based on whether the one or more sets respectively satisfy a dependency test, the dependency test being satisfied when each of the items in a set of items is dependent upon each other item with a prescribed significance level, wherein the dependency test employs a normal approximation test when an occurrence count of the items of a set is above a threshold value, and a Poisson approximation test otherwise; and (iii) output the one or more identified patterns based on results of the dependency tests; and a memory, coupled to the at least one processor, which stores at least one of the input data set and the one or more identified patterns.

23. The apparatus of claim 22, further comprising, prior to the searching operation, the operation of normalizing the input data set.

24. The apparatus of claim 23, wherein the input data set comprises event data and the normalizing operation comprises transforming at least a portion of the event data into event classes such that the event data is non-application-dependent.

25. The apparatus of claim 24, wherein the event data transformation operation further comprises the operation of mapping two or more attributes associated with an event into an event class.

26. The apparatus of claim 25, wherein the mapping operation is performed in accordance with a lookup table.

27. The apparatus of claim 24, wherein the event data is in a tabular form with a first number of columns before the transformation operation and in a tabular form with a second number of columns after the transformation operation, the second number of columns being less than the first number of columns.

28. The apparatus of claim 22, wherein the outputting operation further comprises converting the one or more identified patterns into a human readable format.

29. The apparatus of claim 22, wherein the searching operation further comprises the operation of performing a level-wise scan based on a set length to determine candidate sets of items in the input data set that satisfy the dependency test.

30. The apparatus of claim 29, further comprising the operation of pruning candidate sets.

31. An article of manufacture for mining one or more patterns in an input data set of items, the article comprising a machine readable medium containing one or more programs which when executed implement the steps of:

identifying one or more sets of items in the input data set as one or more patterns based on whether the one or more sets respectively satisfy a dependency test, the dependency test being satisfied when each of the items in a set of items is dependent upon each other item with a prescribed significance level; and outputting the one or more identified patterns based on results of the dependency tests;

wherein the dependency test employs a normal approximation test when an occurrence count of the items of a set is above a threshold value, and a Poisson approximation test otherwise.

32. An article of manufacture for mining one or more patterns in an input data set of items, the article comprising a machine readable medium containing one or more programs which when executed implement the steps of:

obtaining an input data set of items;

searching the input data set of items to identify one or more sets of items in the input data set as one or more patterns based on whether the one or more sets respectively satisfy a dependency test, the dependency test being satisfied when each of the items in a set of items is dependent upon each other item with a prescribed significance level; and outputting the one or more identified patterns based on results of the dependency tests;

wherein the dependency test employs a normal approximation test when an occurrence count of the items of a set is above a threshold value, and a Poisson approximation test otherwise.

* * * * *

UNITED STATES PATENT AND TRADEMARK OFFICE
CERTIFICATE OF CORRECTION

PATENT NO. : 6,990,486 B2
DATED : January 24, 2006
INVENTOR(S) : Sheng Ma et al.

It is certified that error appears in the above-identified patent and that said Letters Patent is hereby corrected as shown below:

Column 7,
Line 40, replace " $c(E) \geq c_a = \max\left\{c: \sum_{i=c}^{n} \binom{n}{i}(p^*)^i(1-p^*)^{n-i} < \alpha\right\}$ " with -- $c(E) \geq c_a = \max\left\{c: \sum_{i=c}^{n} \binom{n}{i}(p^*)^i(1-p^*)^{n-i} < a\right\}$ --.

Column 8,
Line 14, replace " $minsup(E) = \max\left\{c:1 - \sum_{i=0}^{c-1} \frac{e^{-np^*}(np^*)^i}{i!} < \alpha\right\}$ " with -- $minsup(E) = \max\left\{c:1 - \sum_{i=0}^{c-1} \frac{e^{-np^*}(np^*)^i}{i!} < a\right\}$ --.

Column 14,
Line 28, replace "11" with -- 9 --.

Signed and Sealed this

Eighteenth Day of April, 2006

JON W. DUDAS
*Director of the United States Patent and Trademark Office*